United States Patent
Nallamothu et al.

(10) Patent No.: US 11,621,910 B1
(45) Date of Patent: Apr. 4, 2023

(54) CONCURRENT ROUTING FOR NETWORK DEVICES

(71) Applicant: Juniper Networks, Inc., Sunnyvale, CA (US)

(72) Inventors: Vinay K Nallamothu, Sunnyvale, CA (US); Lester Bird, Tracy, CA (US); Zhenghui Cai, Frederick, MD (US)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

(21) Appl. No.: 17/247,905

(22) Filed: Dec. 29, 2020

Related U.S. Application Data (60) Provisional application No. 63/043,106, filed on Jun. 23, 2020.

(51) Int. Cl.
| | |
|---|---|
| *H04L 5/14* | (2006.01) |
| *H04L 45/021* | (2022.01) |
| *H04L 45/52* | (2022.01) |
| *H04L 45/42* | (2022.01) |
| *H04L 45/00* | (2022.01) |
| *H04L 45/655* | (2022.01) |

(52) U.S. Cl.
CPC .......... *H04L 45/021* (2013.01); *H04L 45/42* (2013.01); *H04L 45/52* (2013.01); *H04L 45/563* (2013.01); *H04L 45/655* (2022.05)

(58) Field of Classification Search
CPC ..... H04L 45/021; H04L 45/655; H04L 45/42; H04L 45/52
See application file for complete search history.

(56) References Cited

U.S. PATENT DOCUMENTS

| | | | |
|---|---|---|---|
| 8,259,564 B1* | 9/2012 | Gredler | G06F 11/2005 370/227 |
| 9,813,379 B1* | 11/2017 | Shevade | H04L 45/24 |
| 10,313,225 B1* | 6/2019 | Shevade | H04L 45/14 |
| 10,508,929 B2* | 12/2019 | Trevino | H04W 40/34 |
| 2017/0104672 A1* | 4/2017 | Liang | H04L 45/52 |
| 2017/0257306 A1* | 9/2017 | Huang | H04L 12/4641 |
| 2018/0324097 A1* | 11/2018 | Liu | H04L 47/125 |
| 2019/0036822 A1* | 1/2019 | Zhuang | H04L 45/26 |
| 2019/0140950 A1* | 5/2019 | Zhuang | H04L 12/66 |
| 2019/0173791 A1* | 6/2019 | Lim | H04L 45/60 |
| 2020/0366605 A1* | 11/2020 | Zhuang | H04L 45/26 |
| 2020/0374214 A1* | 11/2020 | Lu | H04L 45/22 |
| 2020/0412635 A1* | 12/2020 | Jha | H04L 45/306 |
| 2021/0160101 A1* | 5/2021 | Semwal | H04L 49/3009 |

* cited by examiner

*Primary Examiner* — Abdelnabi O Musa
(74) *Attorney, Agent, or Firm* — Shumaker & Sieffert, P.A.

(57) ABSTRACT

The disclosure describes techniques for concurrently operating multiple network stacks, one operating natively and one operating remotely, to control the routing table within a router of a network. An example network device includes a control unit comprising one or more processors. A native routing stack executes on the control unit to exchange routing protocol advertisements with a peer network device in accordance with a routing protocol. The native routing stack is configured to insert first routing entries into a routing table. The first routing entries are based on the routing protocol advertisements. A controller interface executed by the control unit receives second routing entries from a network controller and inserts the second routing entries into the routing table. A routing process generates a forwarding table based on the first and second routing entries.

20 Claims, 5 Drawing Sheets

CONCURRENT ROUTING FOR NETWORK DEVICES

PRIORITY CLAIM

The application claims the benefit of U.S. Provisional Application 63/043,106, filed Jun. 23, 2020, which is incorporated by reference herein in its entirety.

TECHNICAL FIELD

The disclosure relates to computer networks and, more particularly, to computer network routing.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP). Routing information imported by a router or statically configured by an operator is stored in routing tables of the router and may be subsequently advertised by the routing protocols to the router's neighbors.

Routers operate according to a routing policy framework that is configurable to permit the network operator to control the flows of routing information and packets. A routing policy for a router controls the flow of routing information between the routing protocols and the routing tables as well as between the routing tables and the forwarding table. Import routing policies control the routing information that is placed in the routing tables, and export routing policies control the routing information that is advertised from the routing tables.

SUMMARY

In general, the disclosure describes techniques for concurrently operating multiple network stacks, one operating natively and one operating remotely, to control the routing table within a router of a network. In software-defined networks (SDNs), the control plane functionality of a network device may be performed at least in part by a network controller that is external to the device. For example, the network controller may manage the routing table (sometimes referred to as a "routing information base" or "RIB") of a network device using an application programming interface (API) of the network device that permits the network controller to inject routes into the routing table and thus to the forwarding table (sometimes referred to as a "forwarding information base" or "FIB"). However, the network controller may lose connection with the network device such that the network controller is no longer able to manage the routing table. As described herein, a native routing stack operated by the network device control plane can facilitate concurrent management of the routing table along with a controller routing stack executed by a routing process on the network controller (sometimes referred to as a "controller routing process"). In this way, the native routing stack facilitates continuity of routing table management if the connection between the network controller and the network device is lost.

In some examples, the network device is configured a logical interface configured with separate addresses for the native routing stack and the controller routing stack. Each address can be used to exchange route advertisements (e.g., Border Gateway Protocol (BGP) advertisements, etc.) with other network devices. The network device relays routes received via the routing interface for the controller routing stack to the network controller and advertises routes received from the network controller via the routing interface for the controller routing stack. The network device operates the native routing stack to exchange route advertisements with other network devices in routing protocol sessions. From the perspective of the other network devices, the network device with the logical interface configured with separate addresses may therefore appear to be two different network devices. Both the controller routing stack and the native routing stack insert receives routes into the routing table. Each of these routes may be tagged with an identifier for the routing stack that received the route and the active routes may be selected from the routing table by the routing protocol process of the network devices and added to the forwarding table in the forwarding plane of the network devices. In general, routes injected by the controller routing stack are preferred over those received by the native routing stack. However, when the network device loses a connection to the network controller, the routing protocol process of the network device may remove the routes associated with the controller routing stack and select routes in the routing table that are tagged as having been received by the native routing stack. This facilitates a system using the benefits of a software-defined network while providing continuity of network routing when communication between the network controller and network device is disrupted.

An example network device includes a control unit comprising processing circuitry; a native routing stack configured for execution by the control unit to exchange routing protocol advertisements with a peer network device in accordance with a routing protocol, and wherein the native routing stack is configured to insert first routing entries into a routing table, the first routing entries based on the routing protocol advertisements; and a controller interface configured for execution by the control unit to receive second routing entries from a network controller and insert the second routing entries into the routing table; and a routing process configured to generate a forwarding table based on the first and second routing entries.

An example method includes exchanging, by a native routing stack of a network device, routing protocol advertisements with a peer network device in accordance with a routing protocol; inserting, by the native routing stack, first routing entries into a routing table, the first routing entries based on the routing protocol advertisements; receiving, by a controller interface of the network device, second routing entries from a network controller; inserting, by the controller interface, the second routing entries into the routing table; and generating, by a routing process of the network device, a forwarding table based on the first and second routing entries.

An example non-transitory computer-readable medium comprises instructions that, when executed, cause a network device to exchange, by a native routing stack of the network device, routing protocol advertisements with a peer network device in accordance with a routing protocol; insert, by the native routing stack, first routing entries into a routing table, the first routing entries based on the routing protocol advertisements; receive, by a controller interface of the network device, second routing entries from a network controller; insert, by the controller interface, the second routing entries into the routing table; and generate, by a routing process of the network device, a forwarding table based on the first and second routing entries.

The details of one or more examples are set forth in the accompanying drawings and the description below. Other features, objects, and advantages will be apparent from the description and drawings, and from the claims.

BRIEF DESCRIPTION OF DRAWINGS

Like reference numerals denote like elements throughout the text and figures.

DETAILED DESCRIPTION

Figure 1:
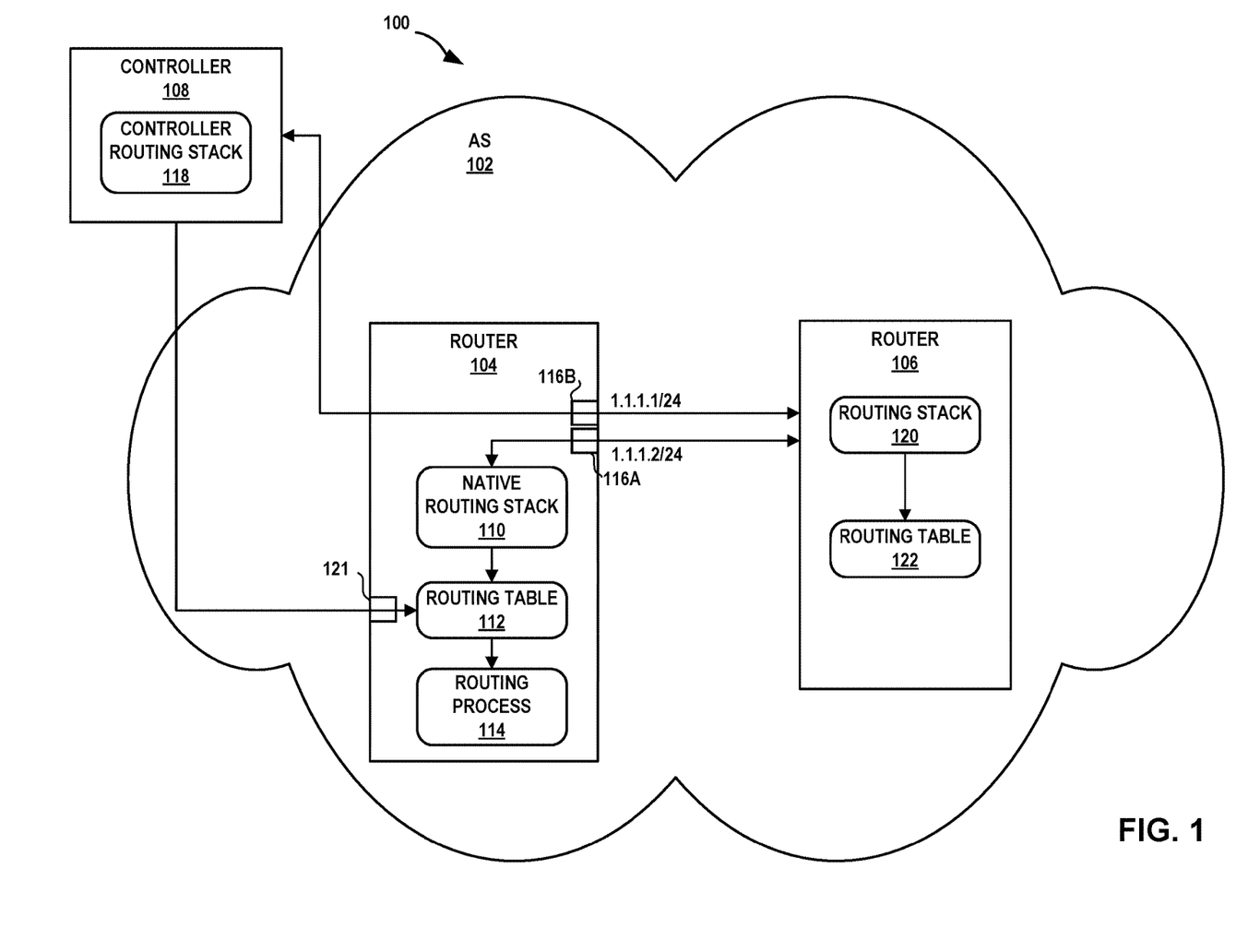
FIG. 1 is a block diagram illustrating a network system including a router configured to provide concurrent routing, in according to techniques described herein.

FIG. 1 is a block diagram illustrating a network system including a router configured with concurrent route management, according to techniques described herein. Network system 100 includes an example autonomous system 102 (illustrated as "AS 102" Autonomous system 102 may be one of many autonomous systems within network system 100 that are interconnected by communication links. The term "communication link," as used herein, comprises any form of transport medium, wired or wireless, and can include intermediate nodes such as network devices. Network system 100 may in some instances represent the Internet or any other publicly accessible computer network, a private network, or a virtual private network (VPN).

Devices of each of autonomous system 102 runs one or more routing protocols, such as one or more exterior routing protocols and one or more interior gateway protocols (IGPs). Examples of IGPs include Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP). Examples of exterior routing protocols include Exterior Border Gateway Protocol (BGP) and Exterior Gateway Protocol. Autonomous system 102 includes a set of one or more routers operating within a single administrative domain according to a routing policy. Autonomous system 102 has an identification number provided by an Internet registry or by an Internet service provider (ISP) that uniquely identifies the autonomous system from other autonomous systems. In some instances, the identification number may be drawn from a private identifier number space and therefore unique only within a private network comprising autonomous system 102. In various embodiments, autonomous system 102 may represent a service provider network, an enterprise or campus network, a content access network (CAN), or a content delivery network (CDN), for example. In addition, one or more service providers, content provider, or enterprise/campus network administrators may administer any one or more of autonomous systems 102. While illustrated as being members of the same autonomous system 102, router 104 and router 106 may be members of different autonomous systems.

Routers 104 and 106 of autonomous system 102 implement at least one routing protocol exchange routing information for routing packets, and autonomous system 102 may offer network packet delivery to a network (or subnet) of one or more endpoints identified by a network address prefix that encompasses the network address range defined by the network addresses of endpoints. Routing information exchanged via routing protocols may include topology information for one or more network layer protocols. For example, router 106 may advertise routing information to router 104 that is received from one or more interior routing protocol speakers of AS 102B executing an IGP, such as Internal BGP (iBGP), Open Shortest Path First, Routing Information Protocol, or Intermediate System to Intermediate System. Topology information may also include administratively configured routes or other information on router 106. Network layer protocols may include Internet Protocol version 4 (IPv4), Internet Protocol version 6 (IPv6), Layer 2 Virtual Private Networking (L2VPN), Layer 3 VPN (L3VPN), and BGP with Traffic Engineering extensions (BGP-TE).

Control plane functionality of router 104 is at least in part controlled by a network controller 108 using software-defined networking. Network controller 108 may represent a network appliance or one or more servers. Network controller 108 may be an SDN controller. Network controller 108 includes controller routing stack 118. In some examples, controller routing stack 118 may be operating a Border Gateway Protocol (BGP). In such example, controller routing stack 118 may be referred to as controller BGP ("cBGP"). Controller routing stack 118 imports and exports routes in routing protocol sessions. To import routes controller routing stack 118 receives route advertisements that indicate, for example, that the sender is the next hop to a destination. For example, controller routing stack 118 may receive route advertisements in the form of BGP UPDATE messages that include Network Layer Reachability Information (NLRI). Controller routing stack 118 receives these route advertisements and applies one or routing policies to control the routes received via one or more routing protocols. These routing policies may evaluate each incoming route against policy rules and/or filters to accept or reject the route. Accepted routes may be injected into routing table 112 as routing entries. In some cases, accepted routes from controller routing stack 118 are tagged and/or otherwise marked as being injected by controller routing stack 118 to facilitate router 104 handling these routes if controller 108 loses connection with router 104. Controller routing stack 118 may export routes (e.g., transmitting route advertisements for BGP, etc.). Controller routing stack 118 applies routing policies to, for example, determine the routes from routing table 112 that are to be exported.

In accordance with techniques described in this disclosure, router 104 includes a native routing stack 110, at least one routing table 112, and routing process 114. Native routing stack 110 imports and exports routes in routing protocol sessions via address 116A for native routing stack 110. Addresses 116A and 116B are shown for illustrative purposes and may be addresses configured on the same logical interface. Addresses 116A and 116B may be from the same prefix, and thus corresponding protocol sessions by native routing stack 110 and controller routing stack 118 may use session addresses with addresses with the same prefix, which may reduce the number of NLRI being advertised into the network. In some examples, native routing stack 110 may be operating using BGP. In such example, native routing stack 110 may be referred to as native BGP ("nBGP"). To import routes, native routing stack 110 receives route advertisements using address 116A that indicate, for example, that the sender is the next hop to a destination. For example, native routing stack 110 may receive route advertisements in the form of BGP UPDATE messages that include NLRI via address 116A. Native routing stack 110 receives these route advertisements and may apply one or routing policies to control the routes received via one or more routing protocols. These routing policies may evaluate each incoming route against policy rules and/or filters to accept or reject the route. Accepted routes may be injected into routing table 112 as routing entries. In some cases, accepted routes from native routing stack 110 are tagged and/or otherwise marked as being injected by native routing stack 110. Native routing stack 110 may export routes via address 116A (e.g., transmitting route advertisements for BGP, etc.). Native routing stack 110 applies routing policies to, for example, determine the routes from routing table 112 that are to be exported. In some examples, when native routing stack 110 advertises and/or exports routes, native routing stack 110 uses same next hop address as controller routing stack 118 (e.g., address 116B, etc.). In such examples, to other routers (e.g., router 106, etc.), the routing advertisements from native routing stack 110 and controller routing stack 118 appear to be redundant to reduce churn in the forwarding table of the other routers.

Addresses 116A and 116B (collectively, "addresses 116") may be addresses configured on the same logical interface that facilitates native routing stack 110 and controller routing stack 118 exchanging routing information from other routers (e.g., router 106, etc.) Addresses 116 are configured such that native routing stack 110 and controller routing stack 118 appear to other routers as if they are two separate routers in network 100. This facilitates, for example, integrating router 104 and controller 108 that operate concurrent routing stacks into network 100. Traffic received on address 116B is forwarded, by router 104, to the appropriate routing interface of controller 108. In the illustrated example, router 104 includes two addresses 116. However, router 104 may be configured with any number of addresses 116 to connect to routers of different configurations (e.g., as described below in FIGS. 3A and 3B, etc.). To import and export routes, controller routing stack 118 uses address 116B. For example, controller routing stack 118 may receive route advertisements via address 116B.

In some examples, the hardware port of router 104 on which addresses 116 are configured may be configured as a WAN port. Router 104 may apply a filtering mechanism to direct a route advertisement (or other packet) received at this port to either native routing stack 110 or to controller 108 (and controller routing stack 118) based on the destination of the route advertisement. Router 104 may send the route advertisement to controller 108 using remote procedure calls (RPC) (e.g., gRPC) which invokes a Tun/Tap or similar interface for injecting the route advertisement into the network stack of controller 108, for eventual processing by one or more routing protocols (e.g., BGP) executed by controller 108 to manage controller routing stack 118.

Controller 108 is connected to router 104 via controller interface 121. Controller interface 121 may represent, for example, a management interface, an application programming interface (API), RPCs, a configuration interface such as NETCONF, or other interface running protocols by which controller 108 may inject routes into route 104. The controller interface 121 provides, for example, access to base routing services shared among routing protocols.

Routing table 112 is a list of known destinations or destination networks and information on how to reach the network. Each entry in routing table 112 ("a route entry or route") is identified by the destination network to which traffic can be forwarded. The destination network, which may be represented by an IP address and netmask, can be an IP network, subnetwork, supernet, or a host device. Routing table entries can originate from directly connected networks, dynamic routing protocols such as OSPF, BGP, or RIP via native routing stack 110, dynamic routing protocols such as OSPF, BGP, or RIP via controller routing stack 118, routes that are imported from other routers or virtual routers, and/or statically configured routes, etc. Only one routing table 112 is illustrated for simplicity. Router 104 may include many routing tables for respective protocols, for instance.

Routing table 112 may represent a default routing table for router 104. The default routing table may include a routing table for unicast IPv4 routes, a routing table for multicast IPv4 routes, a routing table for unicast IPv6 routes, a routing table for Multiprotocol Label Switching (MPLS) information, and so forth. Routing table 112 may alternatively be explicitly configured in configuration data (not shown in FIG. 1) for router 104 as a named routing table.

Routing process 114 uses the collected routing information in routing table 112 to select the active route to each destination, which is the route used by router 104 to forward incoming packets to that destination. To route traffic from a source host to a destination host via router 104, e.g., router 104 learns the path that the packet is to take. These active routes are inserted into the forwarding table of router 104 and used by the forwarding plane for packet forwarding. For example, routing process 114 may generate the forwarding table in the form of a radix or other lookup tree to map packet information (e.g., header information having destination information and/or a label stack) to next hops and ultimately to interface ports of router 104.

To select the active route to each destination, routing process 114 prefers routing entries that are injected by controller routing stack 118. In some such examples, routing process 114 may treat routing entries injected by controller routing stack 118 as active routing entries and may ignore routing entries injected by native routing stack 110. When routing process 114 detects connection the connection with controller 108 is lost, routing process 114 acts to prevent active routing entries within the forwarding table from becoming stale. Routing process 114 withdraws routing entries from routing table 112 that were injected by controller routing stack 118. In some examples, routing process 114 waits a period of time (e.g., five seconds, ten seconds, etc.) to, for example, provide an opportunity for the connection to controller 108 to be restored. Routing process then selects active routes for the forwarding table based on routing entries injected into routing table 112 by native routing stack 110. Subsequently, when the connection to controller 108 is reestablished, routing process 114 may use new routing entries injected by controller routing stack 118 to select the active routes.

In some examples, router 104 may include two routing tables 112 where native routing stack 110 inserts routes into one routing table (sometimes referred to as the "native routing table") and controller routing stack 118 inserts routes into a different routing table (sometimes referred to as the "controller routing table"). In such examples, routing process 114 may maintain a primary forwarding table based on the controller routing table and a secondary forwarding table based on the native routing table. A default route (e.g., 0/0 for IPv4, ::/0 for IPv6, etc.) is installed in the primary forwarding table that points to a table next hop (e.g., into the secondary forwarding table). Using a firewall filter, the forwarding plane of router 104 may perform lookups based on the primary forwarding table associated with the controller routing stack 118 for all incoming packets. When connection with controller 112 is lost and the routes in the controller routing table are withdrawn (e.g., causing the routes in the primary forwarding table to be withdrawn), the default route causes the lookups to be performed by the secondary forwarding table that is managed (e.g., by routing process 228) by the native routing table. Using such a technique, routes in the native routing table will take effect until all of the routes injected by controller routing stack 118 are matched first.

Once native routing stack 110 has selected a route, instead of directly injecting the route to the forwarding table for router 104, native routing stack 110 updates the routes in routing table 112. Routing process 114 selects routes from the routing table 112 for addition to the forwarding table. In this way, routes installed to the forwarding table remain consistent.

In some examples, router 104 operates virtual routing instances for native routing stack 112 and a virtual routing stance for controller routing stack 118. Each virtual routing instance includes a dedicated set of logical interfaces with identical addressing. A default (e.g., static) route in the forwarding table associate with controller routing stack 118 points to the forwarding table associated with native routing stack 112. When connection to controller 108 is lost, dynamic routes in the forwarding table associated with controller routing stack 118 are removed. As a result, the default route causes incoming packets to be routed using the forwarding table associated with native routing stack 112.

In this way, the native routing stack 110 facilitates continuity of routing table 112 management if the connection between network controller 108 and router 104 is lost.

Router 106 is an example router with which controller 108 and/or router 104 exchanges routes. In the illustrated example, router 106 includes routing stack 120 and routing table 122. Routing stack 120 may receive route adverts from native routing stack 110 and controller routing stack 118. When route advertisements from native routing stack 110 indicate that the interface associated with controller routing stack 118 is the next hop, upon receiving route advertisements from native routing stack 110 and controller routing stack for the same route, routing stack 120 may discard the route advertisement originating from native routing stack 110 as being duplicative. When the interface associated with controller routing stack 118 is a lower IP address than the interface associated with native routing stack 110, routing stack 120 may discard the route advertisement originating from native routing stack 110 as being duplicative. In such a manner, routing stack 120 inserts one route into routing table 122 despite receiving two route adverts (e.g., one from controller routing stack 118 and one from native routing stack 110). This reduces churn in the forwarding table of router 106. Router 106 sends route advertisements to address 116A and address 116B as if the addresses 116 were different routers. Thus, when router 106 is not configured like router 104, router 106 may exchange routes with router 104 without changes to router 106.

Although the techniques of this disclosure are described primarily with respect to BGP, this is merely an example, and the techniques may applied in a similar way to facilitate concurrent routing for IGPs such as Open Shortest Path First, Routing Information Protocol, Intermediate System-to-Intermediate System, other exterior gateway routing protocols, and other protocols requiring distribution of routing and/or forwarding information within a network, such as Label Distribution Protocol.

Figure 2:
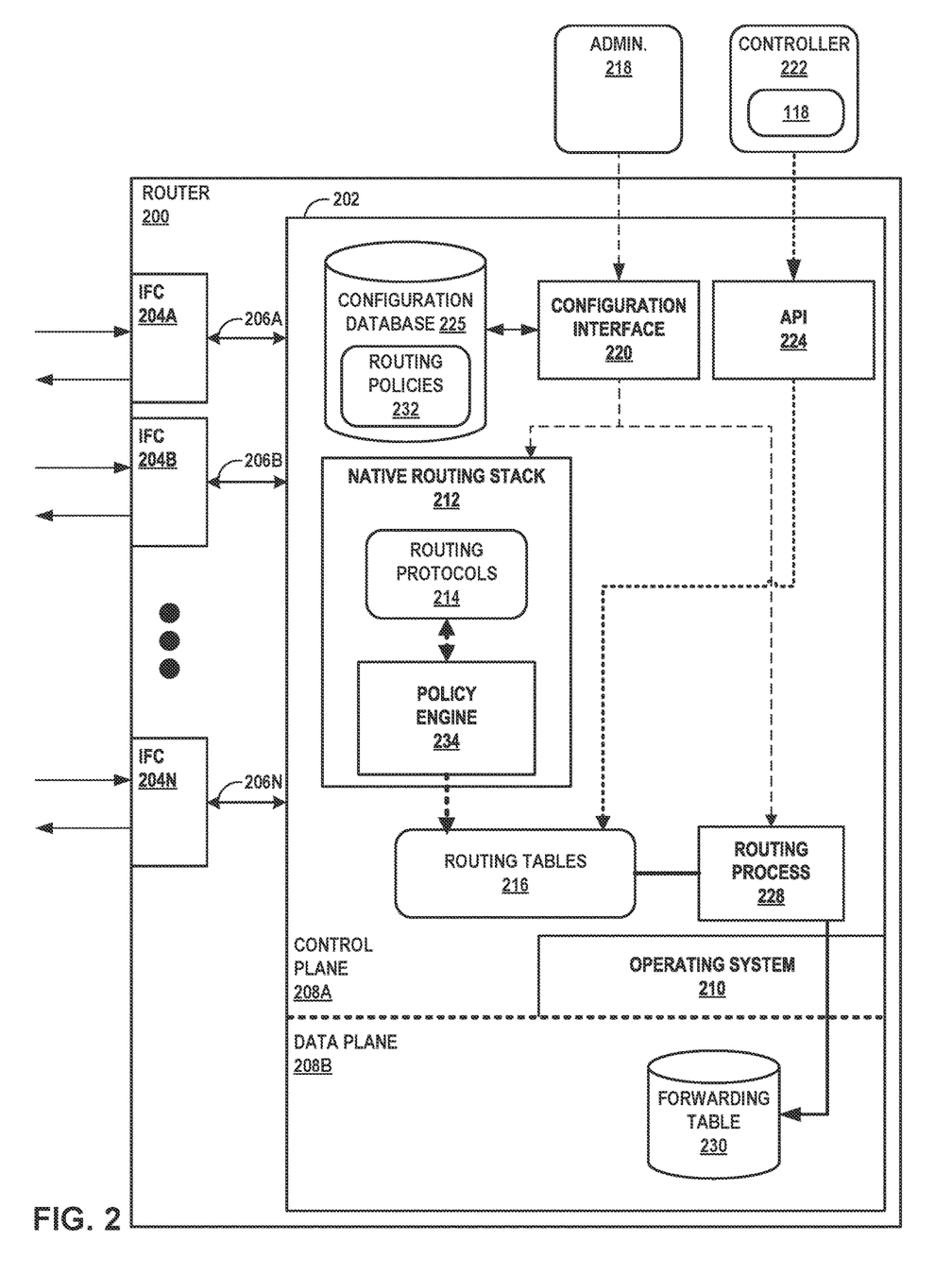
FIG. 2 is a block diagram illustrating an example of a router that uses concurrent routing, in accordance with techniques of the disclosure.

FIG. 2 is a block diagram illustrating an example of a router that uses concurrent routing, in accordance with techniques of the disclosure. For purposes of illustration, example router 200 may be described in the context of network system 100 and may represent an example instance of router 104 of FIG. 1.

Router 200 includes a control unit 202 and interface cards 204A-204N (collectively "IFCs 204") coupled to control unit 202 via internal links 206A-206N. Control unit 202 may comprise one or more processors (not shown in FIG. 2) that execute software instructions, such as those used to define one or more software or computer programs, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 202 is divided into two logical or physical "planes" to include a first control or routing plane 208A ("control plane 208A") and a second data or forwarding plane 208B ("data plane 208B"). That is, control unit 202 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 208A represents hardware or a combination of hardware and software of control unit 202 that define control plane functionality of router 200. Control plane 208A manages and controls the behavior of router 200, including the behavior of data plane 208B. Operating system 210 of control plane 208A provides a run-time environment for multiple different processes. Operating system 208 may represent, for example, a UNIX operating system derivative such as Linux or Berkeley Software Distribution (BSD).

Operating system 320 offers libraries and drivers by which processes may interact with data plane 208B, for example, or other hardware of router 200, including a filesystem, storage device(s), and main memory for router 200. Libraries and drivers of operating system 210 may include Application Programming Interfaces (APIs) that provide standard interfaces for developers to invoke the functionality of operating system 210 and router 200 exposed by the libraries and drivers.

Control plane 208A executes one or more processes. Native routing stack 212 represents a routing protocol process that executes one or more routing protocols 214 by which at least some of the routing information stored to one or more routing tables 216 may be determined. Native routing stack 212 may represent an example instance native routing stack 110 of FIG. 1. Routing entries injected into routing tables 216 by native routing stack212 are tagged and/or or otherwise marked such that they are identifiable as being injected by native routing stack212 to facilitate routing process 228 managing routes inserted into a forwarding table when router 200 loses connection with controller 222. Routing tables 216 represent a data structure for storing routing information and may represent tables, lists, trees/tries, or other data structures. Routing tables 216 may represent example instances of routing table 112 of FIG. 1. A routing table may alternatively be referred to as a routing information base ("RIB") or may alternatively be considered a data structure within the routing information base of the router 200.

Routing tables 216 stored to a computer-readable storage device of control unit 202 (not shown in FIG. 2) may include information defining at least a portion of a topology of a network, such as network system 100 of FIG. 1. Each of routing tables 216 may be associated with a different address family or network layer protocol, such as unicast or multicast IPv4 and IPv6, and MPLS. Any one or more of routing tables 216 may be predefined by the routing protocol process 212 or may be explicitly created by an administrator 218 using configuration interface 220 or by controller 222 using application programming interface (API) 224. Router 200 receives configuration data via the configuration interface 220 or API 224 and stores the configuration data to configuration database 226.

Configuration interface 220 is a process executing on control plane 208A that provides an interface by which administrator 218, a network operator or network management system for instance, may modify the configuration database 226 of router 200. Configuration interface 220 may present a Command Line Interface (CLI) and/or a graphical user interface (GUI) by which an administrator or other management entity may modify the configuration of router 200 using text-based commands and/or graphical interactions, respectively. In addition, or in the alterative, configuration interface 220 may present an agent that receives Simple Network Management Protocol (SNMP) or Netconf commands from a management device to set and retrieve configuration information in configuration database 226 for router 200.

Application programming interface 224, in the illustrated example, is an API by which a controller 222 may modify the configuration database 226. Additionally, controller 222 may inject routing entries into any of routing tables 216 via API 224. Routing entries injected into routing tables 216 by controller 222 are tagged and/or or otherwise marked such that they are identifiable as being injected by controller 222. Controller 222 may represent a network management system, a software-defined networking (SDN) controller, and/or orchestration system. Controller 222 may be an example of controller 108 of FIG. 1. API 224 may be a HTTP-based RESTful interface using JavaScript Object Notation (JSON) or eXtensible Markup Language data objects for exchanging configuration data and routing information between the controller 222 and the router 200. API 224 may be another type of API, such as a Remote Procedure Call (RPC)-based API.

API 224 may include an add route method by which API 224 receives routes for adding to any of routing tables 216. The add route method may include parameters for one or more routes and an identifier of the routing table to which to add the one or more routes. A route may be defined using at least a destination prefix and prefix length, and optionally a next hop. A routing table may be specified for each route. In response to receiving data invoking an add route method of API 224, API 224 adds routes included in the data to the routing table specified by the data. Adding the route includes tagging the route as being inserted by API 224 and/or controller 222 (e.g., routing entries tagged as inserted by API 224 may be considered inserted by controller 222, etc.). This facilitates routing process 228 selecting appropriate routes for forwarding table 230. Configuration interface 220 may include an add route command for adding a route to any of routing tables 216. The add route command may include parameters for one or more routes and an identifier of the routing table(s) to which to add the one or more routes. In response to receiving an add route command, routing process 228 adds routes included in the data to the routing table specified by the add route command. As used herein, an API "method" may refer to an RPC or other similar inter-device communication interface function, operation, call, or method.

API 224 may also include a delete route method by which API 224 receives a request to delete one or more routes from any of routing tables 216. The delete route method may include parameters for the one or more routes to be deleted and the identifier of the routing table from which the routes are to be deleted. In response to receiving data invoking a delete route method of API 224, API 224 deletes the routes specified in the data from the routing table(s) specified by the data. API 224 may also include methods for reading routes from a routing table or updating routes in a routing table. Configuration interface 220 may include a delete route command for deleting a route from any of routing tables 216. The delete route command may include parameters for one or more routes and an identifier of the routing table from which to delete the one or more routes. In response to receiving a delete route command, routing process 228 deletes the routes included in the data from the routing table specified by the delete route command. Configuration interface 220 may include commands for displaying the routes stored by any of routing tables 216.

Routing process 228 resolves the topology defined by routing information in routing tables 216 to select and/or determine one or more active routes through the network. Routing process 228 may be an example of routing process 114 of FIG. 1. Routing process 228 may then synchronize data plane 208B with these active routes, where data plane 208B maintains a representation of these routes as forwarding table 230 (alternatively, "forwarding information base (FIB) 230"). Routing process 228 processes and downloads select routes to the forwarding table 230. Routing process 228 may generate forwarding table 230 in the form of a radix or other lookup tree to map packet information (e.g., header information having destination information and/or a label stack) to next hops and ultimately to interface ports of IFCs 204.

When a connection (e.g., a TCP connection) between controller 222 and router 200 is active, routing process 228 generates forwarding table 230 using routing entries in routing tables 216 that are injected by controller 222. To facilitate this selection, as described above, routing entries are tagged based on whether they were inserted by controller 222 or by native routing stack 212. When the connection with controller 222 is lost, routing process 228 generates forwarding table 230 using routing entries in routing tables 216 that are injected by native routing stack 212. In some examples, before using entries injected by native routing stack 212, routing process 228 waits a configurable threshold period of time (e.g., five seconds, ten seconds, etc.). This period of time is long enough, for example, for routing process 228 to continue to use routing entries injected by controller 222 for the threshold period of time to tolerate relatively short interruptions of the connection between the controller 222 and router 200. This period of time is short enough, for example, for routing process 228 to switch to the routing entries injected by native routing stack 212 before routing entries injected by controller 222 become stale. After the threshold period of time, routing process 228 may withdraw routing entries injected by controller 222 from routing tables 216. Upon resumption of the connection between controller 222 and router 200, routing process 228 may generate forwarding table 230 using routing entries in routing tables 216, preferring routing entries injected by controller 222 over routing entries injected by protocol process 212. The operating system 210 kernel may maintain a master copy of the forwarding table 230 and install portions of the master copy to forwarding components of data plane 208B, such as packet forwarding engines.

Forwarding or data plane 208B represents hardware or a combination of hardware and software of control unit 202 that forwards network traffic in accordance with forwarding table 228. Data plane 208B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a chassis of router 200 or combination of chassis.

Configuration interface 222 and/or API 224 receive configuration data defining routing policies 232, also stored to configuration database 226. Routing policies 232 may include one or more import routing policies and one or more export policies. Policy engine 234 applies import routing policies to determine the routes from routing protocols 214 that are to be imported to routing tables 216. Policy engine 234 applies export routing policies to determine the routes from routing tables 216 that are to be exported to routing protocols 214.

Figure 3:
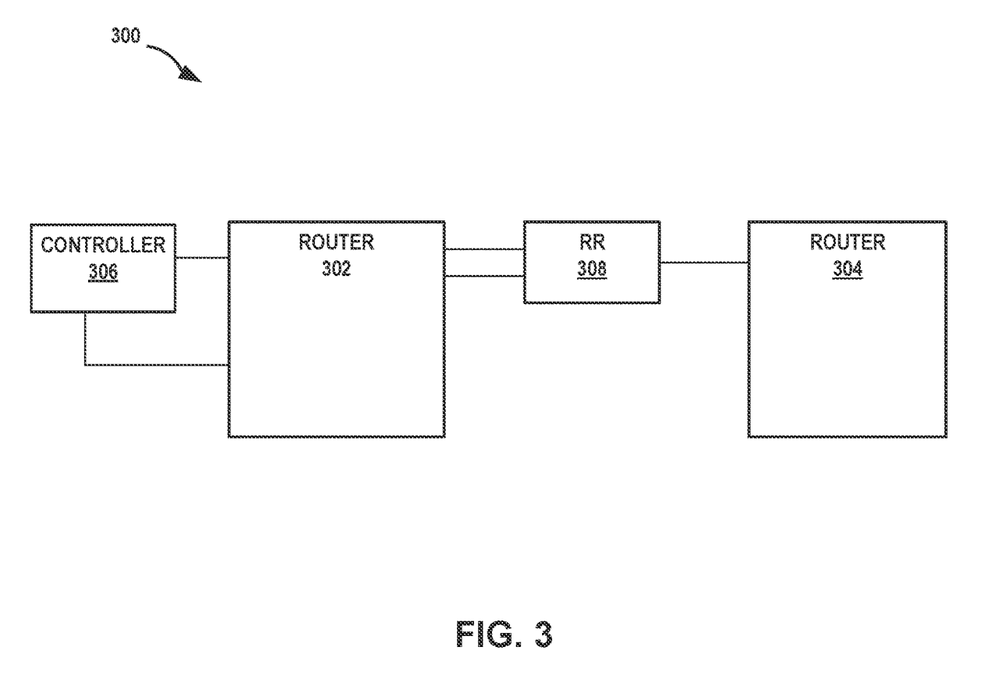
FIG. 3 is a conceptual diagram of an example configuration for routers in a network system including a router configured to provide concurrent routing, in according to techniques described herein.

FIG. 3 is a conceptual diagram of an example configuration for routers 302 and 304 in a network 300. Router 302 may be an example of router 104 and router 200 of FIGS. 1 and 2, respectively. Router 304 may be an example of router 106 of FIG. 1. Controller 306 may be an example of controller 108 and controller 222 of FIGS. 1 and 2, respectively. Router 302 is connected to router 304 via a route reflector 308 (illustrated as "RR 308"). Route advertisements sent to route reflector 308 are reflected out to all of the other routers. As described above, from the perspective of route reflector 308, the interface to the native routing stack of router 302 and the interface to the controller routing stack of controller 306 are treated as being two different routers by route reflector 308. When router 304 advertises a route, route reflector 308 transmits the route advertisement over both the controller routing stack interface and the native routing stack interface. Route reflector 308 reflects routes it considers as the best. For example, when route reflector 308 receives two route advertisements for the same route (e.g., one from the controller routing stack interface and one the native routing stack interface, etc.), route reflector 308 only reflects one of the route advertisements to the other routers connected to route reflector 308 (e.g., router 304, etc.). Route reflector 308 may prefer, for example, the path with lowest interface address (e.g., the interface for the controller routing stack).

Figure 4:
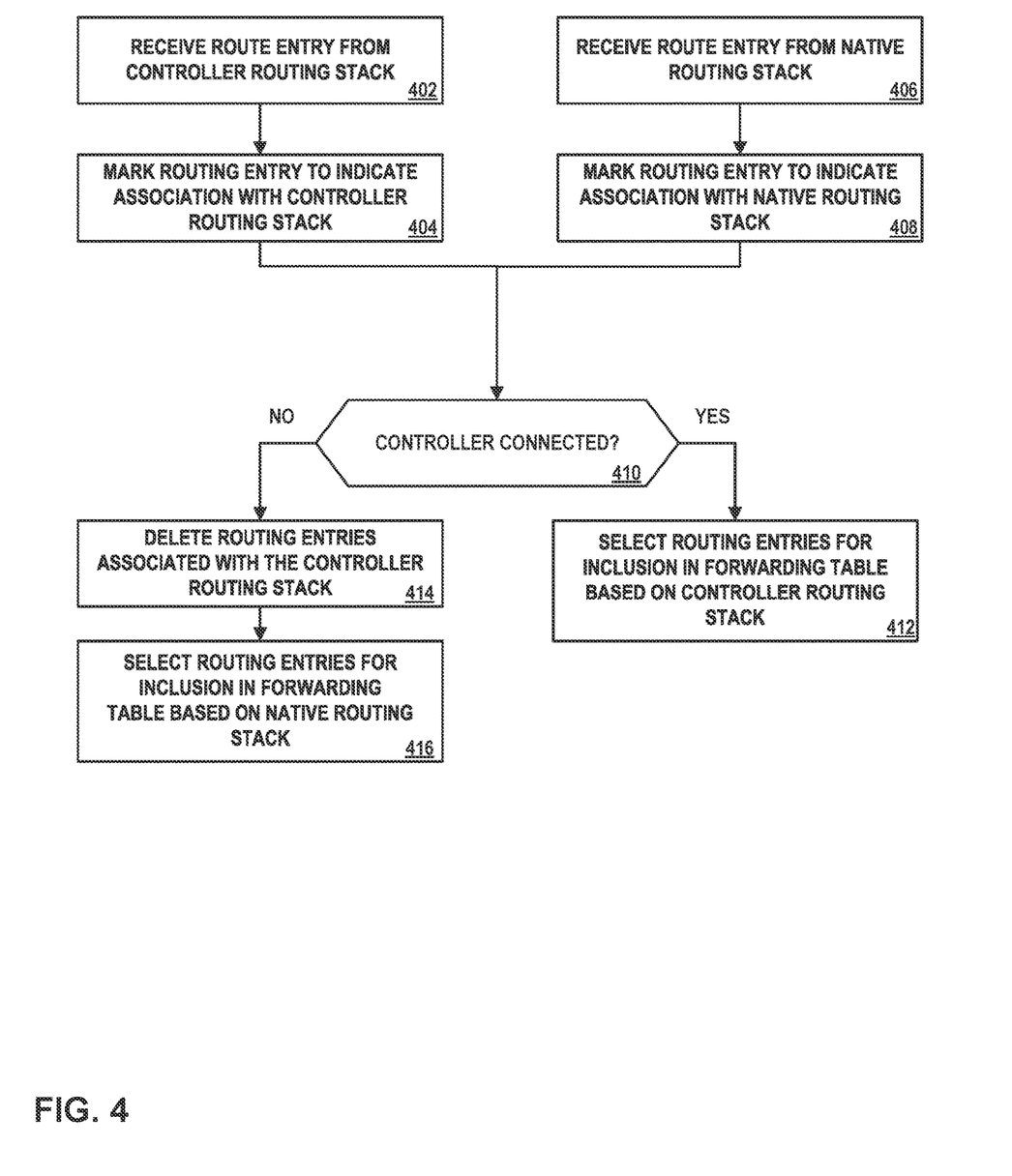
FIG. 4 is a flowchart illustrating an example mode of operation for a network device configured with concurrent routing, in accordance with techniques described herein.

FIG. 4 is a flowchart illustrating an example mode of operation for a router (e.g., router 104 of FIG. 1, router 200 of FIG. 2, router 302 of FIG. 3, etc.) and a controller (e.g., controller 108 of FIG. 1, controller 222 of FIG. 2 controller 306 of FIG. 3, etc.) configured with concurrent routing, in accordance with techniques described herein. Routing table 112 receives a route entry from controller routing stack 118 (402). Routing table 112 tags the received routing entry to indicate the routing entry is associated with controller routing stack 118 to facilitate, for example, routing process 114 selecting which routes to include in the forwarding table (404). Routing table 112 receives a route entry from native routing stack 110 (406). Routing table 112 tags the received routing entry to indicate the routing entry is associated with native routing stack 110 to facilitate, for example, routing process 114 selecting which routes to include in the forwarding table (408). When selecting routes for inclusion in the forwarding table, routing process 114 determines whether the connection between controller 108 and router 104 is active (410). When the connection is active (YES at 410), routing process 114 selects routing entries in routing table 112 for inclusion in forwarding tabled based on routing entries associated with controller routing stack 108 (412). When the connection is not active (NO at 410), routing process 114 withdraws routing entries from routing table 112 that are associated with controller routing stack 108 (414). Routing process 114 then selects routing entries in routing table 112 for inclusion in forwarding tabled based on routing entries associated with native routing stack 108 (416).

Figure 5:
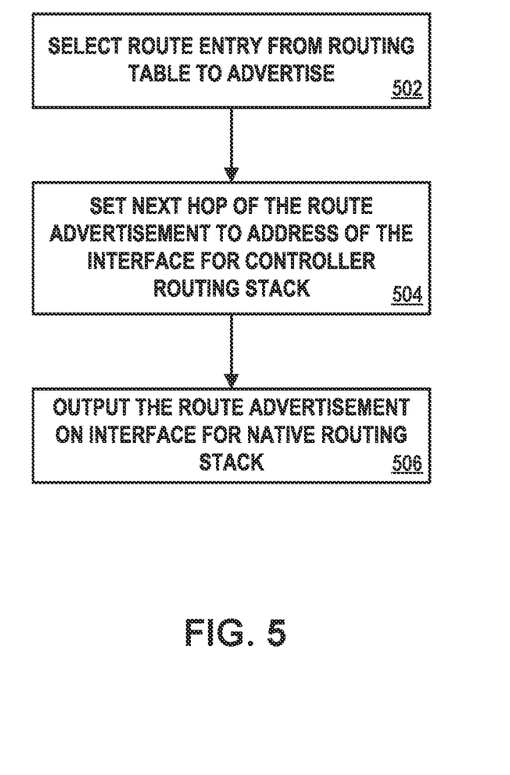
FIG. 5 is a flowchart illustrating example mode of operation for a network device for advertising routes while using concurrent routing, in accordance with techniques described herein.

FIG. 5 is a flowchart illustrating example mode of operation for a network device for advertising routes while using concurrent routing. Native routing stack 110 selects a route entry from routing table 112 (e.g., a route entry associated with native routing stack 110, etc.) (502). Native routing stack 110 generates a route advertisement and sets the next hop of the route advertisement to the address of the interface (e.g., address 116B, etc.) for the controller routing stack 118 (504). Native routing stack 110 outputs the route advertisement on the interface for the native routing stack 110 (e.g. address 116A, etc.) (506).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset.

Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A network device comprising:
a control unit comprising processing circuitry;
a native routing stack configured for execution by the control unit to exchange routing protocol advertisements with a peer network device in accordance with a routing protocol,
wherein the native routing stack is configured to insert first routing entries into a routing table, the first routing entries based on the routing protocol advertisements;
a controller interface configured for execution by the control unit to receive second routing entries from a network controller and insert the second routing entries into the routing table; and
a routing process configured to generate a forwarding table based on the first and second routing entries.

2. The network device of claim 1,
wherein the routing process is configured to generate, in response to receiving an indication a connection between the network device and the network controller is active, the forwarding table based on the second routing entries and not the first routing entries.

3. The network device of claim 1,
wherein the routing process is configured to generate, in response to receiving an indication a connection between the network device and the network controller is not active, the forwarding table based on the first routing entries and not the second routing entries.

4. The network device of claim 1, wherein in response to determining a connection between the network device and the network controller is not active, the routing process is configured to:
withdraw the second routing entries from the routing table; and
generate the forwarding table based on the first routing entries and not the second routing entries.

5. The network device of claim 4,
wherein the first routing entries are tagged with a first tag indicating the first routing entries are associated with the native routing stack, and
wherein the second routing entries are tagged with a second tag indicating the second routing entries are associated with the network controller.

6. The network device of claim 5,
wherein to withdraw the second routing entries from the routing table, the routing process is configured to select routing entries having the second tag, and
wherein to generate the forwarding table based on the first routing entries and not the second routing entries, the routing process is configured to select routing entries having the first tag to insert into the forwarding table.

7. The network device of claim 4, wherein the routing process is configured to:
before withdrawing the second routing entries from the routing table, wait a threshold period of time; and
withdraw the second routing entries from the routing table in response to determining the connection between the network device and the network controller does not become active within the threshold period of time.

8. The network device of claim 1,
wherein the routing protocol advertisements comprise first routing protocol advertisements,
wherein the network device is configured with a first network address on a logical interface for exchanging the first routing protocol advertisements with the peer network device in a first routing protocol session, and
wherein the network device is configured with a second network address on the logical interface for exchanging second routing protocol advertisements with the peer network device in a second routing protocol session.

9. The network device of claim 8, wherein the native routing stack is configured to, when generating the first routing protocol advertisements, use the second network address of the logical interface to cause the peer network device to process the first routing protocol advertisements as if they are associated with the second routing protocol session.

10. The network device of claim 8, wherein the native routing stack is configured to process routing protocol advertisements received via the first routing protocol session at the first network address on the logical interface.

11. The network device of claim 8, wherein the controller interface is configured to send the second routing protocol advertisements, received via the second routing protocol session at the logical interface, to the network controller to be processed.

12. A method comprising:
exchanging, by a native routing stack of a network device, routing protocol advertisements with a peer network device in accordance with a routing protocol;
inserting, by the native routing stack, first routing entries into a routing table, the first routing entries based on the routing protocol advertisements;
receiving, by a controller interface of the network device, second routing entries from a network controller;
inserting, by the controller interface, the second routing entries into the routing table; and generating, by a routing process of the network device, a forwarding table based on the first and second routing entries.

13. The method of claim 12, comprising:
in response to receiving an indication a connection between the network device and the network controller is active, generating, by the routing process, the forwarding table based on the second routing entries and not the first routing entries.

14. The method of claim 12, comprising:
in response to receiving an indication a connection between the network device and the network controller is not active, generating, by the routing process, the forwarding table based on the first routing entries and not the second routing entries.

15. The method of claim 12, comprising:
in response to determining a connection between the network device and the network controller is not active, withdrawing, by the routing process, the second routing entries from the routing table, and generating the forwarding table based on the first routing entries and not the second routing entries.

16. The method of claim 15,
wherein withdrawing the second routing entries from the routing table comprises selecting routing entries having a second tag indicating the routing entries are associated with the network controller, and
wherein generating the forwarding table based on the first routing entries and not the second routing entries comprises selecting routing entries having a first tag to insert into the forwarding table, the first tag indicating the routing entries are associated with the native routing stack.

17. The method of claim 15, comprising:
before withdrawing the second routing entries from the routing table, waiting a threshold period of time; and
withdrawing the second routing entries from the routing table in response to determining the connection between the network device and the network controller does not become active within the threshold period of time.

18. The method of claim 12,
wherein the routing protocol advertisements comprise first routing protocol advertisements, the method further comprising:
exchanging the first routing protocol advertisements with the peer network device in a first routing protocol session using a first network address configured on a logical interface, and
exchanging second routing protocol advertisements with the peer network device in a second routing protocol session using a second network address configured on the logical interface.

19. The method of claim 18, comprising:
when generating the first routing protocol advertisements, using, by the native routing stack, the second network address of the logical interface to cause the peer network device to process the first routing protocol advertisements as if they are associated with the second routing protocol session, and
processing routing protocol advertisements received via the first routing protocol session using the first network address at the logical interface.

20. A non-transitory computer readable medium comprising instructions that, when executed, cause a network device to:
exchange, by a native routing stack of the network device, routing protocol advertisements with a peer network device in accordance with a routing protocol;
insert, by the native routing stack, first routing entries into a routing table, the first routing entries based on the routing protocol advertisements;
receive, by a controller interface of the network device, second routing entries from a network controller;
insert, by the controller interface, the second routing entries into the routing table; and
generate, by a routing process of the network device, a forwarding table based on the first and second routing entries.

* * * * *